United States Patent Office 3,236,675
Patented Feb. 22, 1966

3,236,675
HEAT-SEALABLE, COATED POLYPROPYLENE
FILMS
Franco Barbieri Hermitte and Vincenzo Morici, Terni,
Italy, assignors to Montecatini Società Generale per
l'Industria Mineraria e Chimica, a corporation of Italy
No Drawing. Filed Mar. 19, 1962, Ser. No. 181,497
Claims priority, application Italy, Mar. 17, 1961,
5,047/61
6 Claims. (Cl. 117—47)

The present invention relates to the preparation of films based on crystalline polymers of alpha-olefins easily heat-weldable and usable for the fabrication of containers, envelopes, small bags, vessels and for manufactured articles for the packaging industry.

Methods for the prepartion of films from crystalline polymers of alpha-olefins and particularly from polypropylene prepared in the presence of stereospecific catalysts have been already described.

Also the preparation of films stretched in one or two directions by different methods has been previously described.

Because of their mechanical, protective and optical properties, the films obtained from crystalline polyolefins, particularly from polypropylene, are materials for which packaging is the wider foreseeable application field.

A difficulty in the development of applications in this field is the fact that, for transforming the film into finished packagings, most of the available automatic or semiautomatic machines cannot be used, because said machines are unable to work up or transform thermoplastic films such as films of polyolefins and particularly the polypropylene films. This is a consequence of the fact that the automatic or semiautomatic machines have been designed and constructed bearing in mind the characteristics of the material more widely used as packaging today, i.e., the cellophane film.

The essential difference between the polyolefin films, particularly polypropylene film and films made of cellophane, consists in that the polyolefin films are thermoplastic materials while cellophane is a material which is not heat-sensitive at temperatures below its flash point.

As a result of their differences in heat-sensitivity, the two types of materials behave differently when heat-welded by means of the automatic devices associated with the commonly used packaging machines: in fact, whereas cellophane, which is generally coated with a thermoplastic paint, which makes it heat-weldable, is welded without difficulty, the polyolefin films melt at the areas in contact with the welded elements and tend to stick and tear making it practically impossible to keep the machine running at a reasonable speed.

We have now surprisingly found that it is possible to render polyolefin films, either stretched in two directions or unstretched, readily heat-weldable, by coating them with a coating consisting of copolymers of vinyl chloride, particularly with vinyl acetate.

The coating is also applied and more advantageously on a film stretched in two directions and which has been pretreated with a continuous not piercing electric spark; to a surface treatment with a chemical agent (treatment with oxidizing agents, sulphonates and similar products) or to thermal treatment (flame treatment).

The coating can be applied on films stretched in two directions, treated or not by electric discharges, in the presence or not of one or more compounds of the class comprising diisocyanates which act as improving agents in fastening the coating to the support.

The coating may be applied indifferently on one or both sides of the polypropylene film, stretched or not in two directions.

According to the present invention, the coating may be applied according to the known methods, from solutions or dispersions of the coating and/or of the fastening agent in water or in organic solvents, with the known methods, particularly with the buttering, deeping and similar methods.

The thickness of the coating may vary from 2 to $20\mu$. The adhesion degree of the coating on the supporting film is measured by placing a piece of cellulose tape which adheres by pressing on the surface of the coating film and then immediately trying to pull the cellulose ribbon from said surface; the coating having good adhesion remains firmly fastened to the supporting film; on the contrary, the coatings showing a poor or bad adhesion are partially or completely stripped from the supporting film.

The adhesion is also measured by the peeling test, measuring the resistance to the tensile stress of the weld by means of a dynamometer. The following examples are given to illustrate but not to limit the method of the present invention.

*Example 1*

A crystalline isotactic polypropylene film stretched in two directions and having a thickness of $15\mu$, pre-treated on the surface by means of an electric discharge donor apparatus is coated on one side, by means of a commonly used buttering and coupling machine for thin films with a solution having the following composition by weight:

| | Percent |
|---|---|
| Acetone | 79 |
| Copolymer vinyl chloride/vinyl acetate (85–15%) | 20 |
| Condensation product of toluene-diisocyanate and hexanitriol | 1 |

After the buttering, the film is dried in oven at 80° C.; a material is thus obtained, having the total thickness of $18$–$20\mu$ which maintains the transparence and gloss of the original film.

Film strips (2.5 x 10 cm.) have been welded on the coated side by means of a commonly used welder for cellophane by keeping the bar at a variable temperature for 4 seconds and then measuring by means of a dynamometer the resistance to tensile stress of the welding (peeling test).

The results thus obtained are listed in the table:

| Temperature of the welding in ° C.: | Resistance of the welding, g./2.5 cm. |
|---|---|
| 50 | 0 |
| 60 | 50 |
| 70 | 120 |
| 80 | 200 |
| 90 | 300 |
| 100 | 350 |
| 110 | 400 |
| 120 | 400 |

In the test with tape, the coating remains steadily fastened.

The heat-welding range of the film appears to be comprised in the range of 90–120° C. within limits in which the film is not affected by heat.

The film thus obtained has been tested on two types of automatic packaging machines for cellophane: a bag-filling machine and a winding machine.

On the two machines the film caused no inconvenience allowing the production of finished packaging having welding and validity comparable with those which may be obtained with cellophane.

*Example 2*

A film of crystalline isotatic polypropylene which has been stretched in two directions and having the thickness of $20\mu$, pre-treated on the surface with an electric donor spark discharge apparatus is coated on one side, by means of a generally used buttering and coupling machine for thin films, with a solution having the following composition by weight:

| | Percent |
|---|---|
| Acetone | 74.5 |
| Vinyl chloride/vinyl acetate copolymer (85–15) | 22.0 |
| Condensation product of the toluendiisocyanate with hexantriol | 3 |
| Glyceryl monostearate | 0.5 |

After the buttering the film is dried in an oven at 80° C.; thus a material having the total thickness of 25μ is obtained which maintains the transparence and gloss of the original film.

Further to the outstanding optical characteristics determined on the sample of the Example 1, the film obtained according to the present example has a friction coefficient which is remarkably low.

Film strips (2.5 x 10 cm.) have been welded on the side coated with a generally used welder for cellophane keeping the bar at a variable temperature for the duration of 4 seconds and then measuring by means of a dynamometer the resistance to tensile stress of the welding (peeling test).

The results thus obtained are listed in the following table:

| Temperature of the welding, ° C. | Resistance of the welding in g./2.5 cm. |
|---|---|
| 50 | 0 |
| 60 | 50 |
| 70 | 100 |
| 80 | 180 |
| 90 | 250 |
| 100 | 300 |
| 110 | 350 |
| 120 | 350 |

In the test with tape, the coating remains firmly fastened to the support.

*Example 3*

A film of crystalline isotactic polypropylene stretched in two directions and having the thickness of 15μ, pre-treated on the surface with an electric apparatus able to give spark discharges is coated on one side, using a generally used buttering and coupling machine for thin films, with a solution having the following composition by weight:

| | Percent |
|---|---|
| Methylethylketone | 80 |
| Vinyl chloride/vinyl acetate copolymer (80–20) | 18 |
| Condensation product of the toluendiisocyanate with hexantriol | 2 |

After the buttering the film is dried in an oven at 80° C.; thus a material having the total thickness of 18μ is obtained which maintains the transparence and gloss of the original film.

Film strips (2.5 x 10 cm.) have been welded on the side coated with a generally used welder for cellophane keeping the bar at a variable temperature for the duration of 4 seconds and then measuring the resistance to tensile stress of the welding by means of a dynamometer (peeling test).

The results thus obtained are listed in the following table:

| Temperature of the welding, ° C. | Resistance of the welding in g./2.5 cm. |
|---|---|
| 50 | 0 |
| 60 | 50 |
| 70 | 100 |
| 80 | 180 |
| 90 | 250 |
| 100 | 350 |
| 110 | 400 |
| 120 | 400 |

In the test with a tape, the coating remains firmly fastened to the support.

*Example 4*

A crystalline isotactic polypropylene film which has been stretched in two directions and having a thickness of 15μ, pre-treated on the surface by means of an electric apparatus able to give spark discharges is coated on one side, by means of a generally used buttering and coupling machine for thin films, with a solution having the following composition:

| | Percent |
|---|---|
| Chloroform | 37.5 |
| Methylene chloride | 50 |
| Vinyl chloride/vinyl acetate copolymer (85–15) | 15 |
| Condensation product of the toluendiisocyanate with hexantriol | 2 |
| Glycerylmonostearate | 0.5 |

After the buttering the film is dried in an oven at 80° C.; thus a material having the total thickness of 15μ and which maintains the transparence and gloss of the original film is obtained.

Film strips (2.5 x 10 cm.) have been welded on the coated side by means of a commonly used welder for cellophane keeping the bar at a variable temperature for the duration of 4 seconds and then measuring the resistance to the tensile stress of the welding (peeling test) by means of a dynamometer.

The results thus obtained are listed in the following table:

| Temperature of the welding, ° C. | Resistance of the welding in g./2.5 cm. |
|---|---|
| 50 | 50 |
| 60 | 100 |
| 70 | 180 |
| 80 | 250 |
| 90 | 300 |
| 100 | 350 |
| 110 | 350 |
| 120 | 350 |

In the test with a tape, the coating remains firmly fastened in the support.

*Example 5*

A film of crystalline isotactic polypropylene which has been stretched in two directions and having the thickness of 15μ pre-treated on the surface by means of an electric apparatus able to give spark discharges is coated on one side by means of a commonly used buttering and coupling machine for thin films, with a solution having the following composition:

| | Percent |
|---|---|
| Methylene chloride | 66 |
| Carbon tetrachloride | 16.5 |
| Vinyl chloride/vinyl acetate copolymer (90–10) | 15 |
| Condensation product of the toluendiisocyanate with hexantriol | 2 |
| Glycerylmonostearate | 0.5 |

Film strips (2.5 x 10 cm.) have been welded on the side coated by means of a commonly used welder for cellophane keeping the bar at a variable temperature for 4 seconds and then measuring the resistance to tensile stress of the welding by means of a dynamometer (peeling test).

The results thus obtained are listed in the following table:

| Temperature of the welding ° C.: | Resistance of the welding, g./2.5 cm. |
|---|---|
| 50 | |
| 60 | 50 |
| 70 | 100 |
| 80 | 180 |
| 90 | 250 |
| 100 | 300 |

Temperature of the welding, °C.:—Continued  Resistance of the welding, g./2.5 cm.—Continued
- 110 — 350
- 120 — 350

In the test with tape, the coating remains firmly fastened to the support.

*Example 6*

A crystalline isotactic polypropylene film having the thickness of 25µ, pre-treated on the surface by means of an electric apparatus giving spark discharges, is coated on one side by means of a commonly used buttering and coupling machine for thin films, with a solution having the following composition:

| | Percent |
|---|---|
| Acetone | 74.5 |
| Vinyl chloride/vinyl acetate copolymer (85–15) | 22.0 |
| Condensation product of the toluendiisocyanate with hexantriol | 3.0 |
| Glycerylmonostearate | 0.5 |

After the buttering the film is dried in an oven at 80° C.; thus a material having the total thickness of 30µ which maintains the transparence and gloss of the original film is obtained.

Further the outstanding optical characteristics determined in the sample of the Example 1, the film obtained according to the present example has a very low friction coefficient.

Film strips (2.5 x 10 cm.) have been welded on the side coated by means of a commonly used welder for cellophane keeping the bar at a variable temperature for 4 seconds and then measuring the resistance to the tensile stress by means of a dynamometer (peeling test).

The results thus obtained are listed in the following table:

Temperature of the welding, °C.:  Resistance of the welding, g./2.5 cm.
- 50 — 0
- 60 — 50
- 70 — 100
- 80 — 180
- 90 — 250
- 100 — 300
- 110 — 350
- 120 — 350

In the test with tape, the coating remains firmly fastened on the support.

The ratio of copolymer to condensation product shown by the above examples is shown in the following table.

| Example | Percent Copolymer | Percent Condensation Product | Ratio |
|---|---|---|---|
| 1 | 20 | 1 | 20=1 |
| 2 | 22.0 | 3 | 7.3=1 |
| 3 | 18.0 | 2 | 9=1 |
| 4 | 15 | 2 | 7.5=1 |
| 5 | 15 | 2 | 7.5=1 |
| 6 | 22.0 | 3 | 7.3=1 |

Variations can of course be made without departing from the spirit of our invention.

Having thus described our invention what we desire to secure and claim by Letters Patent is:

1. A heat-sealable base film of polypropylene having a high percentage of isotactic crystallinity, said film having anchored thereto a coating consisting essentially of a mixture of vinyl chloride-vinyl acetate copolymer and a condensation product of toluene-diisocyanate with hexantriol, in a ratio of copolymer/condensation product of from 7.3:1 to 20:1.

2. The article of claim 1, wherein the coating contains glyceryl-monostearate.

3. The article of claim 1, characterized in that the base film is an extruded polypropylene film which has been stretched both longitudinally and transversely.

4. The article of claim 1, characterized in that the surface of the base film is first modified by subjecting it to electric discharges.

5. The article of claim 1, characterized in that the surface of the base film is first modified by subjecting it to treatment with a flame.

6. The article of claim 1, characterized in that the surface of the base film is first modified by treating it with a chemical modifying agent.

References Cited by the Examiner

UNITED STATES PATENTS

| | | | |
|---|---|---|---|
| 3,024,216 | 3/1962 | Smitmans et al. | 117—138.8 |
| 3,027,343 | 3/1962 | Kane | 260—45.5 |
| 3,036,930 | 5/1962 | Grimminger et al. | 117—138.8 |
| 3,043,787 | 7/1962 | Bonvicini et al. | 117—138.8 |
| 3,057,756 | 10/1962 | Cornwell | 117—138.8 |
| 3,067,673 | 12/1962 | Anderson | 117—138.8 |
| 3,088,844 | 5/1962 | Hungerford et al. | 117—138.8 |
| 3,111,418 | 11/1962 | Gilbert et al. | 117—138.8 |

WILLIAM D. MARTIN, *Primary Examiner.*

MURRAY KATZ, RICHARD D. NEVIUS, *Examiners.*